US006769027B1

(12) United States Patent
Gebhardt et al.

(10) Patent No.: US 6,769,027 B1
(45) Date of Patent: Jul. 27, 2004

(54) SYSTEM AND METHOD FOR USING MULTI-HEADED QUEUES FOR BOOKMARKING IN BACKUP/RECOVER SCENARIOS

(75) Inventors: Robert William Gebhardt, Boulder, CO (US); Barbara Patrice Havens, Broomfield, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/495,418

(22) Filed: Jan. 31, 2000

(51) Int. Cl.[7] .............................................. G06F 15/16
(52) U.S. Cl. ...................... 709/228; 709/224; 709/239; 718/102; 370/429; 370/450; 710/54
(58) Field of Search ................. 709/102, 104, 709/105, 226–229, 239, 224, 223; 370/389, 390, 428, 429, 449, 450; 710/39, 54; 714/745

(56) References Cited

U.S. PATENT DOCUMENTS

| | | | | |
|---|---|---|---|---|
| 4,590,554 A | * | 5/1986 | Glazer et al. ................. | 714/13 |
| 4,682,284 A | * | 7/1987 | Schrofer ...................... | 710/55 |
| 5,136,707 A | | 8/1992 | Block et al. | |
| 5,222,217 A | * | 6/1993 | Blount et al. ............... | 707/204 |
| 5,455,932 A | * | 10/1995 | Major et al. ................. | 711/162 |
| 5,473,771 A | | 12/1995 | Burd et al. | |
| 5,604,862 A | * | 2/1997 | Midgely et al. .............. | 714/6 |
| 5,737,514 A | * | 4/1998 | Stiffler ......................... | 714/13 |
| 5,920,570 A | | 7/1999 | Gebhardt .................... | 370/429 |
| 5,956,714 A | * | 9/1999 | Condon ........................ | 707/8 |
| 6,058,389 A | * | 5/2000 | Chandra et al. ............... | 707/1 |
| 6,137,807 A | * | 10/2000 | Rusu et al. .................. | 370/429 |
| 6,192,413 B1 | * | 2/2001 | Lee et al. .................... | 709/238 |
| 6,212,543 B1 | * | 4/2001 | Futral .......................... | 718/102 |
| 6,226,759 B1 | * | 5/2001 | Miller et al. .................... | 714/6 |
| 6,351,754 B1 | * | 2/2002 | Bridge et al. ................ | 707/202 |
| 6,353,834 B1 | * | 3/2002 | Wong et al. ................. | 707/202 |
| 6,401,147 B1 | * | 6/2002 | Sang et al. .................... | 710/56 |
| 6,434,605 B1 | * | 8/2002 | Faulkner et al. ............. | 709/213 |
| 6,438,630 B1 | * | 8/2002 | DeMoney ..................... | 710/56 |
| 6,463,032 B1 | * | 10/2002 | Lau et al. .................... | 370/218 |
| 6,546,403 B1 | * | 4/2003 | Carlson et al. ............. | 707/202 |
| 6,597,688 B2 | * | 7/2003 | Narasimhan et al. ....... | 370/353 |
| 6,636,523 B1 | * | 10/2003 | Lau et al. .................... | 370/415 |

FOREIGN PATENT DOCUMENTS

| | | | | | |
|---|---|---|---|---|---|
| JP | 02293950 A | * | 12/1990 | ........... | G06F/12/16 |
| JP | 05120110 A | * | 5/1993 | ........... | G06F/12/00 |
| JP | 2000011520 A | * | 1/2000 | ........... | G11B/19/02 |

OTHER PUBLICATIONS

Pochec, Przemyslaw. "Modelling the Performance of Computer Mirroring with Difference Queues" IEEE Conference on Electrical and Computer Engineering, May 24–28, 1998. vol. 1, Pp. 217–220.*

* cited by examiner

*Primary Examiner*—Rupal Dharia
*Assistant Examiner*—Melvin H. Pollack
(74) *Attorney, Agent, or Firm*—Sheridan Ross P.C.

(57) ABSTRACT

The invention is directed to an architecture that includes a first queue 128, a first queue reader 148 that reads data entities in the first queue, and a first queue writer 124 that writes data entities to the first queue. The architecture is able to periodically set one or more backup administration parameters equal to administration parameter(s) associated with the first queue 128 and, when the first queue 128 is restored, copy data entities from backup storage to the first queue 128 and set the administration parameter(s) to the corresponding backup administration parameter(s).

29 Claims, 5 Drawing Sheets

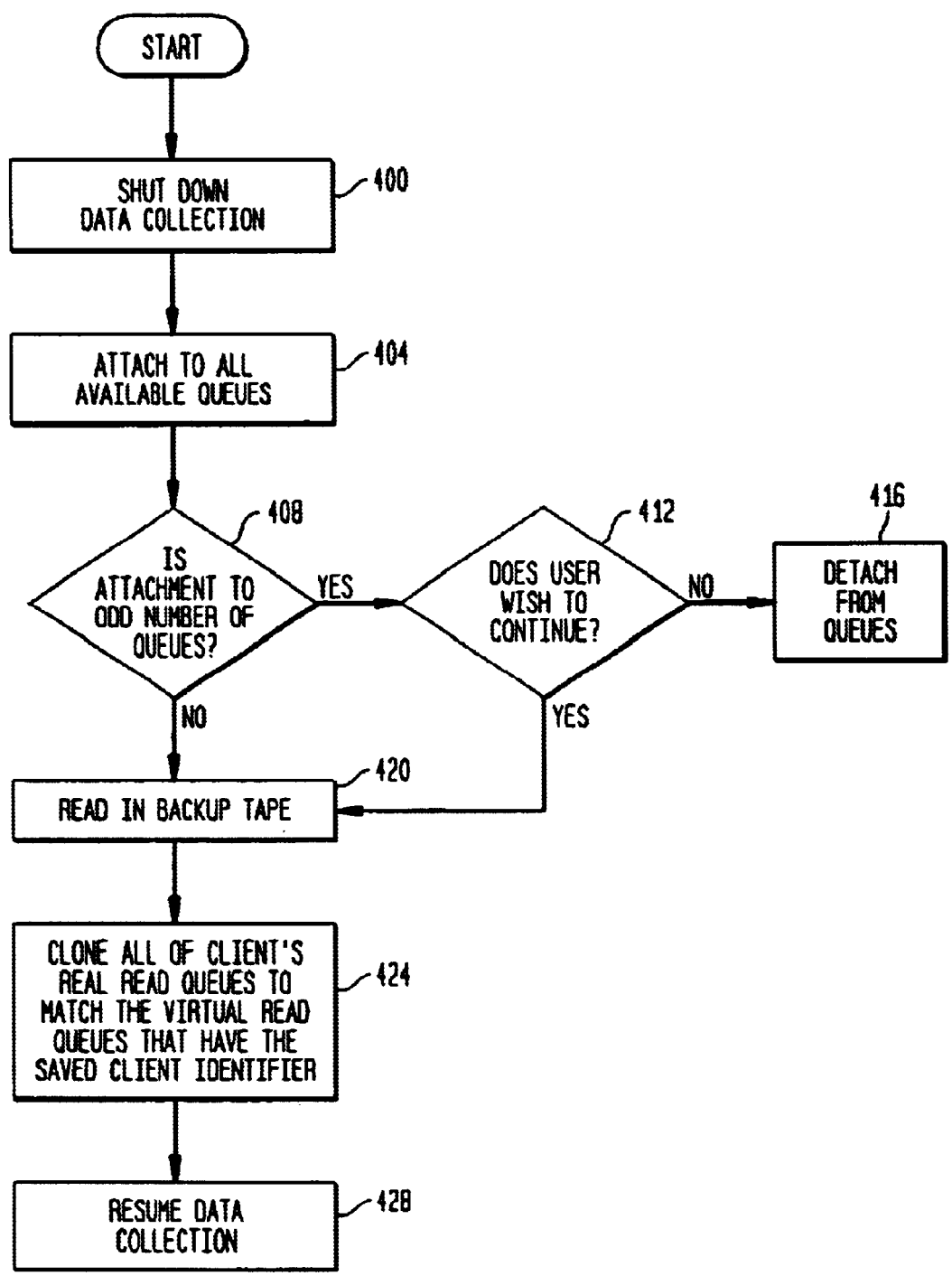

SYSTEM AND METHOD FOR USING MULTI-HEADED QUEUES FOR BOOKMARKING IN BACKUP/RECOVER SCENARIOS

FIELD OF THE INVENTION

The present invention is directed generally to systems and methods for data process control in computing systems and specifically to systems and methods for recording the state of queues of data entities.

BACKGROUND OF THE INVENTION

In data processing control and computing systems, a source of messages generates data messages which must be transmitted to a plurality of destinations. A representative architecture includes a plurality of message servers, a plurality of servers, and a plurality of client processors. The message servers accept calls from users, take messages from the users, and attempt to deliver those messages. Each message-creation call into a message server results in one or more LAN message(s) being sent to one or more servers which update a message status record for the message being delivered. A filter filters the messages and places the filtered messages in a queue. The various messages in the queue are each transmitted to various destinations such as one or more client processors. A message is cleared from the queue only after all pertinent destinations have received the message. Read and acknowledge pointers are maintained by the application processors to avoid repeated transmission of a data entity to any destination. The client processor(s) perform backup/recovery operations of software and data, collect data on each message, store the data in a database, and provide a simple user interface for filtering and viewing records.

Although the data in the client processor can be backed up readily and the data restored from the backup tape, data collection by the client processor must resume at the point in the queue where the backup tape was made and not at the point in the queue where data collection last ended (due, for example, to the backup operation itself or a catastrophic system failure). Otherwise, the application processors and client processors would be operating asynchronously. Accordingly, there is a need for a system and methodology for recording the state of the read queue when the backup operation was performed to permit subsequent restoration of the queue from the backup tape.

SUMMARY OF THE INVENTION

The present invention solves the above problem and represents a significant advance over the prior art. In one embodiment, a method is provided for recording the state of a queue containing a plurality of data entities for purposes of reconstructing or restoring the queue (and its related administration parameters) and synchronizing the processing of the queue by the client and server. The method includes the steps of:

(a) updating, at a first frequency, one or more administration parameters of the queue (e.g., a read, write, examination, and/or acknowledge pointer) and/or the queue itself to avoid repeated transmission of a data entity (e.g., a message) to a given destination; and (b) updating, at a second frequency (less than or equal to the first frequency), one or more backup administration parameter(s) of the queue (such as by copying an administration parameter or the queue itself to form a virtual queue). The backup administration parameter(s) record the state of the queue (such as when a backup operation is performed). As used herein, a "pointer" is a data element that indicates the location of another data element or an identifier that indicates the location of an item of data. Thus, a pointer is typically a data address that tells where to find a desired item. The backup parameters and/or virtual queue permit the client to restart data collection at the appropriate point in the transaction (data) stream after a recover operation has restored its state.

By way of example, read and/or acknowledge pointers are typically updated by the server frequently (e.g., the read pointer is updated for every data item and the acknowledge pointer is updated periodically (e.g., every minute)) during processing of the data entities to permit the processor to progress systematically and efficiently through the queue. Although the parameters are maintained at the server, they are controlled by the client. In contrast, the backup read and/or acknowledge pointers and virtual queue are typically recorded, or updated, in a backup operation infrequently (e.g., daily or even more infrequently).

In one configuration, the backup parameter(s) are indicative of, derived from, and/or correspond to an administration parameter associated with the queue (e.g., a backup acknowledge pointer is derived from an acknowledge pointer associated with the queue). The administration parameter in the updating step (a) typically has a current value while the corresponding backup read and/or acknowledge parameter in the virtual queue has a historic value of (i.e., a value previously assigned to) the administration parameter in the updating step (a). The current value thus typically differs from the historic value during processing of the queue.

In the event of a malfunction of the server and/or client, the administration parameter(s) in the server are reset to match the backup administration parameter(s) and data processing is reinitiated with the server and client operating synchronously. As will be appreciated, the data entities are typically backed up or recorded in a computational component (e.g., a tape) separate from a computational component (e.g., a hard drive) containing the queue.

To conserve computational resources and increase system efficiency, the method can precede steps (a) and (b) above with the step of filtering a second plurality of data entries to form the plurality of data entries. Each of the plurality of data entries is contained in the second plurality of data entries along with additional information.

To permit the backup administration parameter(s) and/or virtual queue to be paired with the pertinent client in a network architecture having multiple clients and multiple backup administration parameter(s) or virtual queues, each of which corresponds to one of the clients, a unique identifier or address (e.g., an address of a backup pointer corresponding to a client, a code corresponding to a client, etc.) can be used to permit the backup administration parameter(s) and/or virtual queue to be associated with its respective client. In one configuration, the backup pointer address is stored on a corresponding client backup tape and the code on the server along with the backup administration parameters associated with the corresponding client. This permits the pertinent backup tape to be used to restore a client and eliminates the need to simultaneously backup all of the clients.

In another embodiment, a system for recording the state of a queue containing a plurality of data entities is provided.

The system includes:
  (a) first means for updating at least one administration parameter of a queue (and/or the queue itself) to avoid repeated transmission of a data entity to a given destination; and
  (b) second means for updating at least one backup administration parameter of the queue and/or a virtual queue associated with the backup parameter.

In yet another embodiment, another system for recording the state of a queue containing a plurality of data entities is provided. The system includes the following components:
  (a) a server including:
    (i) one or more server processors for processing a plurality of first data entities;
    (ii) a server database for storing information received from the one or more processors;
    (iii) a server queue including at least some of the plurality of first data entities; and
    (iv) at least one administration parameter associated with the queue, the at least one administration parameter having a current value;
  (b) a client in communication with the server and including:
    (i) a queue process reader for reading the data entities in the queue; and
    (ii) a client database for receiving and storing the data entities in the queue read by the queue process reader; and
  (c) a set of backup administration parameter(s) maintained and/or controlled using information from at least one of the client and server.

In another embodiment, a system and method for clearing information in a queue of a first server before writing new information to a queue of a second server is provided. This embodiment is particularly useful where a switch is made between a first and second server such that the formerly passive (or second) server is redesignated as the active server and the formerly active (or first) server is redesignated as the passive server. In the embodiment, a timing indicator is provided to the second server to delay writing new information to its queue for a predetermined time period. The predetermined time period is sufficient for the first server to process fully the information in its queue. If the timing indicator is not received or a different timing indicator is received by the second server, new information is written immediately to the queue of the second server. This configuration permits hard or soft mode switches between the servers without loss of queued data entities in either server.

BRIEF DESCRIPTION OF THE DRAWINGS

FIGS. 1A and B are a schematic of an architecture according to a first embodiment; to the first embodiment of the present invention;

FIG. 4 is another flow chart depicting a queue restoration or reconstruction methodology according to the first embodiment.

DETAILED DESCRIPTION

Figure 1A:
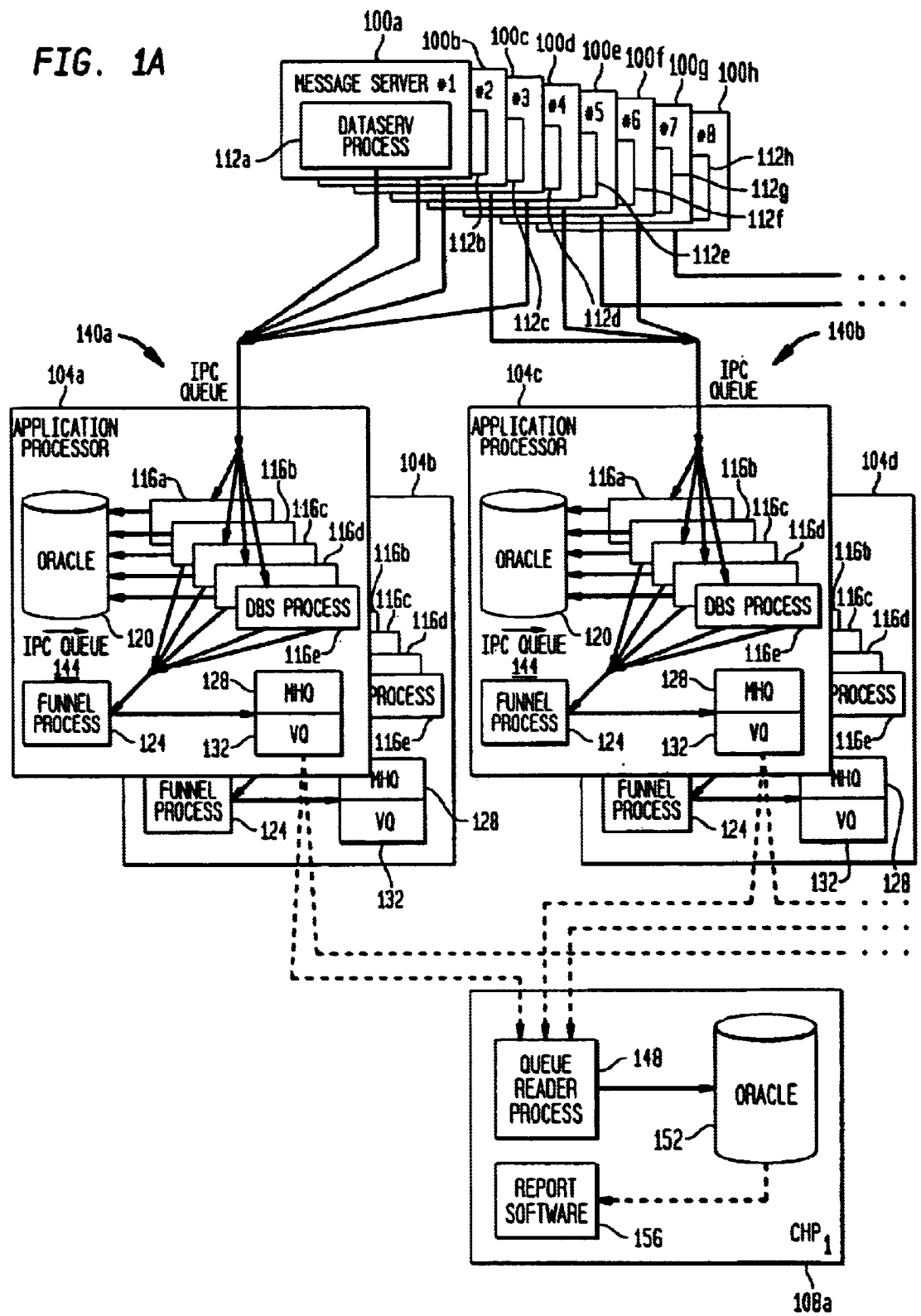
FIGS. 1A and B are schematics of an architecture according to a first embodiment.
Figure 1B:
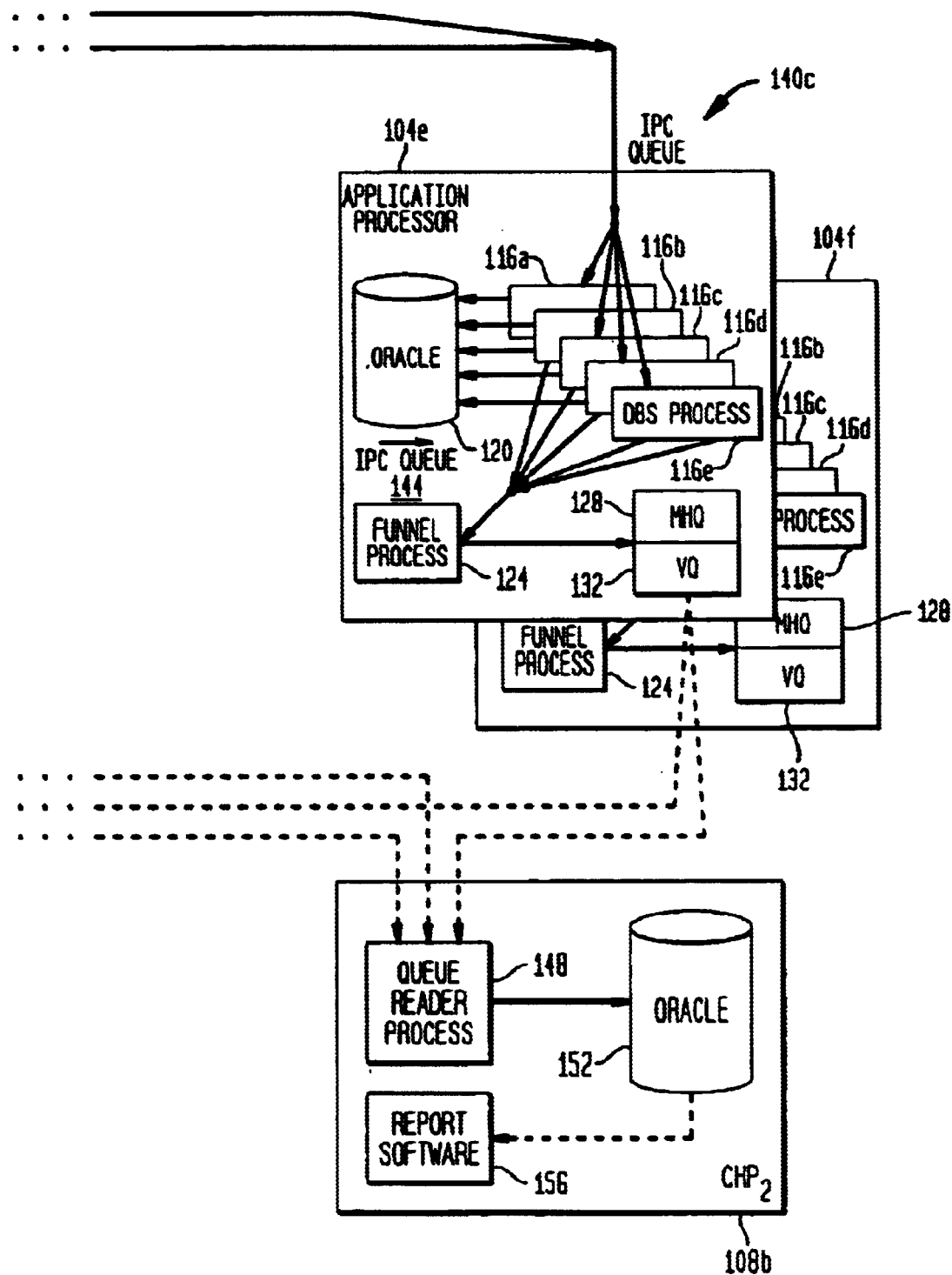

Referring to FIGS. 1A and B, a preferred architecture according to a first embodiment of a present invention is depicted. The architecture includes a plurality of message servers 100$a$–$h$ in communication with a plurality of application processors or servers 104$a$–$f$ which are in turn in communication via dual LANS 105$a$–$b$ with a plurality of call history processors ("CHP's") or clients 108$a,b$. As will be appreciated, the specific numbers of message servers 100, application processors or servers 104, and/or clients 108 depends upon the demands of the application.

The message servers 100$a$–$h$ accept calls from users, take messages from the users, and/or attempt to deliver the messages. Each message-creation call into a message server 100$a$–$h$ results in two LAN messages or data entities being sent by the dataserver processes 112$a$–$h$ of the respective message server 100$a$–$h$ to each of the application processors or servers 104$a$–$g$ in the pertinent pair of application processors 104$a$–$g$. The destination pair of servers 104$a$–$b$, $c$–$d$, and $e$–$f$ depends upon one or more selected parameters such as the hash value of the telephone call's billing number. The LAN messages are typically "insert" messages for updating of a message status table and status request table in each application processor of the pertinent pair. Each delivery attempt generates a "currently being delivered" message followed by a message containing the result of the delivery attempt (e.g., "delivered", "ringing-no answer", "busy", etc.).

The LAN messages provided by the message server 100$a$–$h$ request the primary server to insert the appropriate record in a message status table or a status request table. The message status table can contain fields for any desired characteristic of the LAN message. Typical fields include bill identification information, destination information, and call type. The status request table has a subset of the message status table's fields.

Each server 104$a$–$f$ includes a respective plurality of database processes 116$a$–$e$, a database 120, a funnel process 124, a multi-headed queue 128 (which includes a set of administration parameters), and a virtual queue 132 (which includes a set of backup administration parameters). The various pairs of servers 104$a$–$b$, $c$–$d$, and $e$–$f$ each operate in a hot/warm configuration, in which one server is designated as being primary (and therefore operates in a primary mode) and the other server as being secondary (and therefore operates in a secondary or backup mode). Each server pair holds approximately one-third of the message status records in its respective database 120. The messages status records in each of the paired server's databases 120 are mirror images of one another. The secondary server thus provides redundancy.

The various LAN messages are held by each primary server in a corresponding IPC queue 140$a$–$c$ from which one of the database processes 116$a$–$e$ retrieves a message and updates, inter alia, the message status or status request tables in the database 120, filters the message(s), and writes the filtered message(s) to a second IPC queue 144 that is different from the IPC queues 140$a$–$c$ for processing by the funnel process 124. As will be appreciated, the database processes 116$a$–$e$ operate in parallel and retrieve sequential messages from the IPC queues 140$a$–$c$, filter the messages and write the messages to the second IPC queue 144. Only the primary server 104$a,c,e$ adds messages to the second IPC queue 144 to prevent the transmission of two copies of same insert or update message to a client 108$a,b$.

Figure 2:
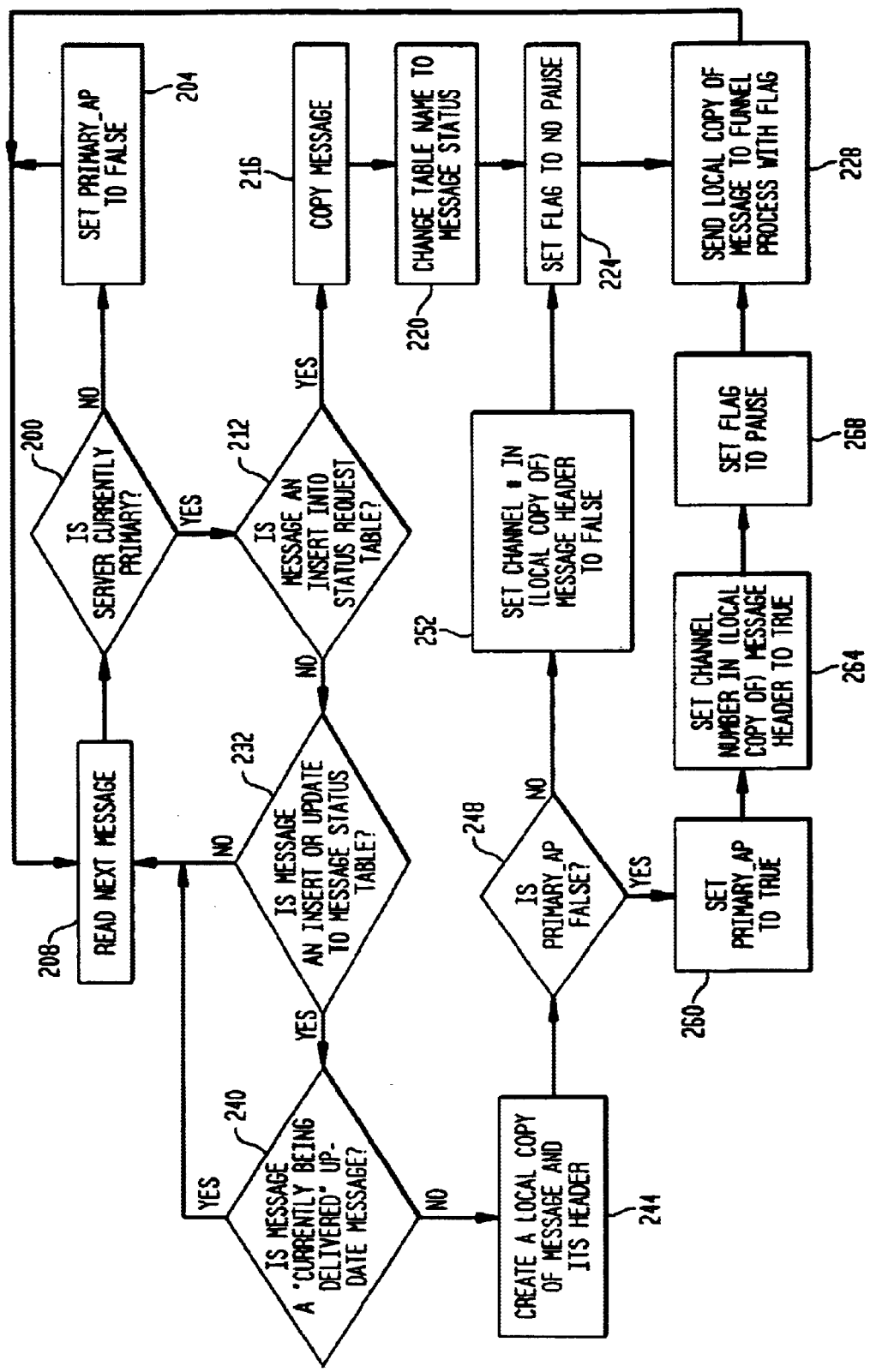
FIG. 2 is another schematic depicting the operation of a database process according to the first embodiment of the present invention.

The operation of the database processes 116$a$–$e$ (which run in parallel) are depicted in FIG. 2. Each process determines 200 if its respective server is currently designated as being the primary server. If not in box 204$a$, primary_AP flag is set to FALSE and the process proceeds to the next message 208 in the IPC queue 140. The primary_AP flag is a static flag that indicates whether the server is currently the primary server and is set to FALSE at start-up. If so in box 212, the process next determines if the message is an insert into the status request table. If so in box 216, a local copy of the message is created, a table name referenced in an insert statement is changed 220 from "status request" to "message status", a timing indicator or a flag is set 224 to NO PAUSE, the local copy of the message and flag are forwarded 228 to the funnel process, and the process proceeds 208 to the next message. The timing indicator, if set to PAUSE when a mode switch occurs between the servers in a server pair, causes the funnel process to delay writing the message to the multi-headed queue 128 to permit the formerly primary server to process or clear its queue 128. If not in box 232, the process determines if the message is an insert or update to the message status table. If not in box 208, the process proceeds to the next message. If so in box 240, the process next determines if the message is a "currently being delivered" update message. If so in box 208, the process proceeds to the next message. If not in box 244, the process creates a local copy of the message and its header. The process next determines 248 if the primary_AP variable is FALSE. If not in box 252, the process sets the channel number in the local copy of the message header to FALSE, sets 224 the flag to NO PAUSE, and sends 228 the local copy of the message and the flag to the funnel process 124. If so in box 260, the process sets the primary_AP variable to TRUE, sets 264 the channel number in the local copy of the message header to TRUE, sets 268 the flag to PAUSE, and sends 228 the local copy of the message and the flag to the funnel process 124.

The PAUSE setting on the flag is thus placed on the first message of the IPC queue after the mode of the server is changed from secondary to primary. When the funnel process 124 receives the flag, it delays writing the message onto the queue 128 for a predetermined period, such as 30 seconds. The predetermined period is sufficient for the other queue in the pair of servers (which was formerly the primary queue) to be cleared of its messages. If a NO PAUSE flag is received, the funnel process 124 writes to the queue 128 immediately. If there is a soft or hard switch, the new primary server will thus not write anything onto its queue 128 until the formerly primary (and now secondary) server's queue 128 has been cleared. This measure ensures that the clients read the insert and update messages in the order in which they were originally sent by the message servers; that is, it ensures that an update is never processed before the insert for the associated record and that the latest update takes precedence over an earlier update.

Because there are multiple data base processes for each server, each time there is a soft- or hard-switch (i.e., each time there is a mode change) between the servers in each pair, each database process will notice the change and send a suitable PAUSE flag to the funnel process of the now primary (and formerly secondary) server. Thus, multiple PAUSE flags will be received by the funnel process of the newly primary server. To deal with these multiple PAUSE flags, the funnel process can keep track of when the mode switches occur (e.g., by checking each message against the system clock to determine if it is the first message received during a predetermined period). This alternative, however, could require the funnel process to check the system time frequently (e.g., more than once per second), which could translate into a significant loss in performance. Alternatively, because mode switches are infrequent (each server pair typically undergoes a soft mode switch monthly and a hard mode switch only a few times per year), it is typically unnecessary to ensure that there is only one writing delay per mode switch. Accordingly, it is generally preferable to permit each database process to provide a PAUSE flag to the funnel process and have the funnel process respond to each such flag with a suitable delay, e.g., 5 seconds. In most applications, the system performance requirements are sufficiently lenient that the additional writing delays caused by the receipt of multiple PAUSE flags by the funnel process are acceptable.

The operation of the multi-headed queue is substantially as set forth in U.S. Pat. No. 5,920,570 which is incorporated herein by this reference. Specifically, a write pointer is employed by the funnel process 124 to sequentially write messages to files in the directory of queue 128. An examination process (or queue reader process 148) is used to make the messages in the queue available to the desired destinations. There is an examination process for each destination and each examination process has its own examination and read indicators, which are typically pointers. The examination pointer is compared to the read pointer and, if the two do not match, the file pointed to by the read pointer is read and transmitted to the specific destination of the read process. The transmission can include such well-known features as acknowledgment and retransmission in case of failure and other transmission features designed to improve reliability. The read pointer is next incremented to point to the next file in the queue 128 (i.e., the read pointer is updated at a first frequency to avoid repeated transmission of a data entity to a given destination). If the examination pointer and read pointer match, the process for transmitting messages to the specific destination is completed for the time being. If it is necessary for the source to have an acknowledgment that all destinations have received the message, then an acknowledgment indicator, such as a pointer, can be used. The acknowledgment indicator is advanced when the queue read process 148 transmits a request for it to be advanced. Typically, this is done whenever a set of inserts or updates from the queue 128 are committed to the client database 152. This can be done, for example, every minute or every 100 transactions, whichever occurs first.

The CHP's or clients 108a,b receive the filtered messages in the queue 128 of each server pair, update message status table in their respective databases 152, provide a simple user interface (typically ASCII character-based) for filtering and viewing the information stored in the databases 152, and provide backup/recovery, archiving, or restoration of software 156 and data in the database 152 in the event of system malfunction. Each client maintains a copy of the entire message status table in its database 152 (i.e., all of the records in the message status tables in all of the servers) for redundancy and reliability. That is to say, both clients collect the same data in their respective databases. Accordingly, the message status tables in the clients contain collectively the same information. Unlike the servers, the clients will not maintain a separate status request table in their respective databases but will store status request information in the message status table in their databases. To accomplish this, the status request insert messages are modified into message status insert messages before being placed on the second IPC queue 144.

The queue reader processes 148a,b read the insert and update instructions on the queues 128 of each server pair and apply those changes to their respective message status tables. Hence, each client will have a current copy of the entire (composite) message status table with the exception of the updates that show a message is "currently being delivered". Accordingly, each queue reader process 148 monitors the queues on all of the server pairs and controls the administration parameters in each server 104 pair. The monitoring process is performed by periodically sending a generic "ping" message to all funnel processes and attaching to the queues on each responding server. As will be appreciated, each client has its own set of read and acknowledge pointers in each application processor.

In the event that only one LAN 105 is up when the client's queue process reader 148 comes up or the LAN currently in use by the queue process reader 148 goes down and the client must switch to the other LAN, the client's queue process reader 148 will broadcast a generic-messaging ping to the funnel processes 124 on all of the servers 104a–f. Generic ping responses will be returned by all operational servers via all possible routes (i.e., all LANs that are up at that time). The reader 148 will then use the most-recently-heard-from routes to contact the queues 128 on all of the servers 104a–f. The generic-messaging ping will be broadcast at regular intervals to re-establish any dropped LAN connections via the currently-available routes.

To record the state of the queue 128a–f at the point in time when a backup operation is performed, a set of backup administration parameters or indicators, such as read, write, examination, and/or acknowledge pointers, are maintained as all or part of the "virtual" read queue 132 by each of the primary and backup servers 104. The virtual read queue 132 is not read by the queue process readers 148 but is used as a bookmark to permit the queue process readers 148 to return to the bookmark in the event that the queues 128 are recovered or restored from the backup records. When a backup operation is performed, the backup parameters associated with the virtual read queues 132 are set to match the corresponding administration parameter or indicator for the active queue 128 (i.e., the backup administration parameters are updated at a second frequency with the first frequency being greater than or equal to the second frequency).

Each client 108a,b has a corresponding virtual read queue 132 in each server. The use of only one virtual read queue 132 for both clients can cause problems when both clients are backed up at the same time. Both backup processes can request changes to the virtual read queue 132 at the same time. Thus, when a backup is performed on a client, a copy of the active queue 128 is made and the copied queue becomes the client's respective virtual read queue (or bookmark) 132.

To permit the virtual read queue 132 to be paired up with the appropriate client, a unique identifier, e.g., an address or addresses of information in the virtual read queue, an alphabetical, numerical, or alphanumerical code or other type of identification information for the client, etc., is recorded by the client on a backup tape (not shown) and/or by the servers. As will be appreciated, a backup tape or other data storage media is used during the backup operation to record all backup information. The backup tape is typically located at the client. The identifier identifies which virtual read queue 132 on each server pair corresponds to the information recorded on the backup tape. Because the queues 128 are cleared continuously of messages, it is necessary to perform the backup operation before the most recent message in the virtual queue 132 is cleared from the queues 128. The clients are backed up at different times rather than simultaneously.

Figure 3:
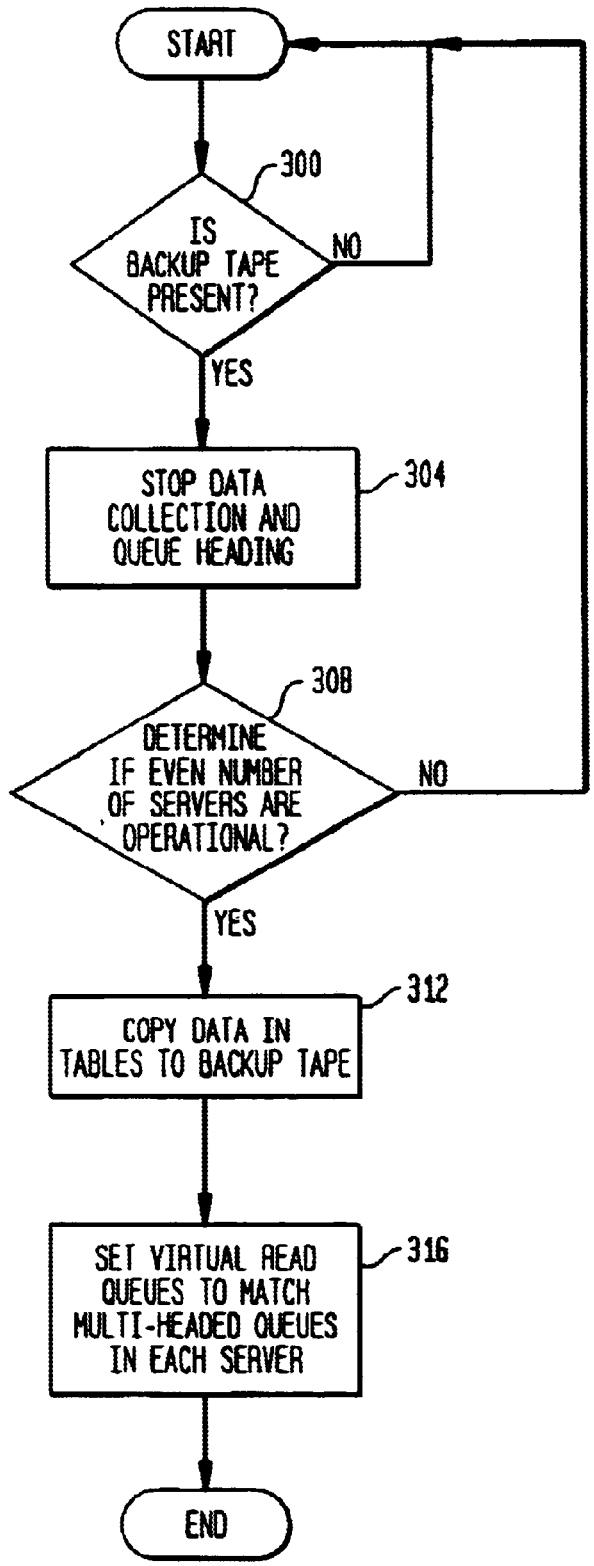
FIG. 3 is another flow chart depicting a backup methodology according to the first embodiment.

The backup operation is depicted in FIG. 3. The client 108 first checks 300 for a backup tape. If the backup tape is present, the client 108 moves the acknowledge pointer (such that it matches the current read pointer) and stops 304 data collection and reading from the queues 128 of all servers. The client 108 next determines 308 if all of the servers are operational by sending signals (e.g., generic-messaging pings) to the funnel processes on all of the servers 104 as described above. If the attachment is to an odd number of funnel processes (meaning that at least one server is down), the client restarts the backup process. If the attachment is to a positive even number of funnel processes (all servers are assumed to be operational), the client 108 copies 312 the data in its respective database 148 onto the backup tape and requests 316 the servers 104a–f to update their respective virtual queues to match the active queues 128. Thus, each virtual queue's administration parameters are set to match the corresponding active queue's administration parameters. Alternately, the client could compare the number of replies from the servers to the number of servers to determine whether all servers are operational.

The queue restoration or reconstruction process is depicted in FIG. 4. The client 108 first shuts down 400 all data collection. The client attaches (by pinging) 404 to all available queues 128. If the client is attached to an odd number of funnel processes 408, the client asks 412 the user whether the user wishes to continue. If not, the client detaches 416 from the processes. If so or if the client is attached to an even number of processes, the client reads 420 the backup tape. The client then clones 424 all of the client's respective active read queues 128 in the servers 104a–f to match the clients' respective virtual read queues 132 in each server that have the saved client's respective identifier. Data collection is then resumed 428 by the client. As will be appreciated, the most recently backed up information (i.e., most recently made backup tape) is used to reset the servers.

The foregoing description of the present invention has been presented for purposes of illustration and description. Furthermore, the description is not intended to limit the invention to the form disclosed herein. Consequently, variations and modifications commensurate with the above teachings, in the skill or knowledge of the relevant art, are within the scope of the present invention. For example, the virtual read queue can be replaced by one backup pointer that corresponds to one or more active pointers (e.g., the active read and/or acknowledge pointers). By way of illustration, the backup pointer can be assigned a value assigned to the read and/or acknowledge pointers which are assigned the same value when data collection is terminated by the client. The embodiments described here and above are further intended to explain best modes for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for recording the state of a queue containing a plurality of data entities, comprising:

(a) providing a first queue comprising a plurality of data entities, a first queue reader operable to read data entities in the first queue, and a first queue writer operable to write data entities onto the first queue, wherein the first queue writer has a corresponding write pointer associated with the first queue to determine a current position of the first queue writer in the first queue and wherein the first queue reader has a corresponding read pointer and a corresponding acknowledge pointer associated with the first queue, the read pointer indicates a next data entity to be read by the first queue reader in the first queue and the acknowledge pointer indicates the last data entity for which an acknowledge signal was received from the first queue reader, wherein at least one of the (i) write pointer and (ii) read and acknowledge pointers has a corresponding backup pointer to track one or more historical positions of a corresponding at least one of the first queue reader and writer in the first queue;

(b) periodically setting the at least one backup pointer equal to the at least one of the (i) write pointer and (ii) read and acknowledge pointers of the first queue;

(c) after several data entities are written to the first queue by the first queue writer, copying the data entities in the first queue to a second backup queue; and (d) when the first queue is restored, copying data entities from the second backup queue to the first queue and setting the at least one of the (i) write pointer and (ii) read and write pointers to the corresponding backup pointer.

2. The method of claim 1, wherein the at least one of the (i) write pointer and (ii) read and acknowledge pointers is the read and acknowledge pointers.

3. The method of claim 2, further comprising an examination pointer associated with the first queue and further comprising:

the first queue reader comparing the read and examination pointers;

when the read and examination pointers are different, the first queue reader reading the data entity pointed to by the read pointer; and when the read and examination pointers are the same, the first queue reader not performing the reading step.

4. The method of claim 2, wherein the second backup queue is associated with the backup pointer and wherein the first queue is located in a server and the first queue reader is located in a client.

5. The method of claim 4, wherein the at least one of the (i) write pointer and (ii) read and acknowledge pointers is the write pointer.

6. The method of claim 5, further comprising a second backup pointer corresponding to the acknowledge pointer, the second backup pointer tracks a historical position of the acknowledge pointer.

7. The method of claim 1, wherein the first queue and second backup queue are each associated with a first server, and further comprising a third queue comprising data entities different from data entities in the first queue and a fourth backup queue, the third queue having a corresponding read pointer to determine a current position of the first queue reader in the third queue, wherein the read pointer of the third queue has a corresponding backup pointer associated with the fourth backup queue to track a historical position of the first queue reader in the third queue, and wherein each of the backup pointers has a corresponding queue identifier indicating with which of the first and third queues the backup pointer is associated.

8. The method of claim 1, wherein the data entities are messages and further comprising:

retrieving a plurality of messages from a message queue;

processing the retrieved messages;

filtering the retrieved messages to form a filtered set of messages, the filtered set of messages having fewer messages than the retrieved messages; and the first queue writer writing the filtered set of messages to the first queue.

9. The method of claim 1, wherein the first queue writer is associated with a first server and a second queue writer is associated with a second server and further comprising:

each of the first and second queue writers determining if the corresponding first and second servers is designated as the primary server;

when the corresponding first and second servers is designated as the primary server, the respective one of the first and second queue writers writes data entities to a corresponding queue, the second queue writer corresponding to a third queue; and when the corresponding first and second servers is designated as the primary server, the respective one of the first and second queue writers does not perform the writing step.

10. The method of claim 9, wherein the first server is the primary server and further comprising:

switching to the second server from the first server such that the second server is now acting as the primary server; and delaying writing data entities to a third queue associated with the second server for a predetermined time interval to permit the first queue to be processed.

11. The method of claim 1, wherein the at least one backup pointer corresponds to a first client and another at least one backup pointer corresponds to a second client and further comprising:

recording a unique identifier to permit the at least one backup pointer to be associated with the first client.

12. The method of claim 4, wherein the second backup queue comprises a second set of data entities previously contained in the first queue and wherein at least some of the data entities currently in the first queue differ from the second set of data entities.

13. The method of claim 7, wherein backup pointers associated with the second backup queue are set equal to the pointers associated with the first queue at different times than the backup pointers associated with the fourth backup queue are set equal to the pointers associated with the third queue.

14. A computer readable medium comprising instructions to perform the steps of claim 1.

15. A system for recording the state of a queue containing a plurality of data entities, comprising:

a first queue comprising a plurality of data entities;

a first queue reader operable to read data entities in the first queue;

a first queue writer operable to write data entities onto the first queue, wherein the first queue writer has a corresponding write pointer associated with the first queue to determine a current position of the first queue writer in the first queue and wherein the first queue reader has a corresponding read pointer and a corresponding acknowledge pointer associated with the first queue, the read pointer indicates a next data entity to be read by the first queue reader in the first queue and the acknowledge pointer indicates the last data entity for which an acknowledge signal was received from the first queue reader, and wherein at least one of the (i) write pointer and (ii) read and acknowledge pointers has a corresponding backup pointer to track one or more historical positions of a corresponding at least one of the first queue reader and writer in the first queue; and a processor operable to (a) periodically set the at least one backup pointer equal to the at least one of the (i) write pointer and (ii) read and acknowledge pointers of the first queue, (b) after several data entities are written to the first queue by the first queue writer, in,) copy the data entities in the first queue to a second backup queue, and (c) when the first queue is restored, copy data entities from the second backup queue to the first queue and set the at least one of the (i) write pointer and (ii) read and write pointers to the corresponding backup pointer.

16. The system of claim 15, wherein the at least one of the (i) write pointer and (ii) read and acknowledge pointers is the read and acknowledge pointers.

17. The system of claim 16, further comprising an examination pointer associated with the first queue and wherein the first queue reader is operable to compare the read and examination pointers; when the read and examination pointers are different, read the data entity pointed to by the read pointer; and when the read and examination pointers are the same, not perform the reading step.

18. The system of claim 16, further comprising the second backup queue associated with the backup pointer and wherein the first queue is located in a server and the first queue reader is located in a client.

19. The system of claim 18, wherein the at least one of the (i) write pointer and (ii) read and acknowledge pointers is the write pointer.

20. The system of claim 19, further comprising a second backup pointer corresponding to the acknowledge pointer, the second backup pointer tracks a historical position of the acknowledge pointer.

21. The system of claim 15, wherein the first queue and second backup queue are each associated with a first server and further comprising a third queue comprising data entities different from data entities in the first queue and a fourth backup queue, the third queue having a corresponding read pointer to determine a current position of the first queue reader in the third queue, wherein the read pointer of the third queue has a corresponding backup pointer associated with the fourth backup queue to track a historical position of the first queue reader in the third queue, and wherein each of the backup pointers has a corresponding queue identifier indicating with which of the first and third queues the backup pointer is associated.

22. The system of claim 15, wherein the data entities are messages and the queue writer is operable to retrieve a plurality of messages from a message queue, process the retrieved messages, filter the retrieved messages to form a filtered set of messages, the filtered set of messages having fewer messages than the retrieved messages, and write the filtered set of messages to the first queue.

23. The system of claim 15, wherein the first queue writer is associated with a first server and a second queue writer is associated with a second server and wherein a corresponding one of the first and second queue writers is operable to (a) determine if the corresponding first and second servers is designated as the primary server, (b) when the corresponding first and second servers is designated as the primary server, write data entities to a corresponding queue, the second queue writer corresponding to a third queue, and (c) when the corresponding first and second servers is designated as the primary server, not perform the writing operation.

24. The system of claim 23, wherein the first server is the primary server at a first time and wherein the second server becomes the primary server at a second later time and wherein the second queue writer is further operable to delay writing data entities to a third queue associated with the second server for a predetermined time interval to permit the first queue to be processed.

25. The system of claim 15, wherein the at least one backup pointer corresponds to a first client and another at least one backup pointer corresponds to a second client and the processor is further operable to record a unique identifier to permit the at least one backup pointer to be associated with the first client.

26. The system of claim 18, wherein the second backup queue comprises a second set of data entities previously contained in the first queue and wherein at least some of the data entities currently in the first queue differ from the second set of data entities.

27. The system of claim 21, wherein backup pointers associated with the second backup queue are set equal to the pointers associated with the first queue at different times than the backup pointers associated with the fourth backup queue are set equal to the pointers associated with the third queue.

28. The method of claim 1, wherein the data entities are copied to the second backup queue less frequently than the at least one backup pointer is set equal to the at least one of the (i) write pointer and (ii) read and acknowledge pointers of the first queue.

29. The method of claim 1, wherein both statements (i) and (ii) are true.

* * * * *